United States Patent
Paek et al.

(10) Patent No.: US 8,349,194 B2
(45) Date of Patent: Jan. 8, 2013

(54) METHOD FOR MANUFACTURING FLEXIBLE DISPLAY SUBSTRATE AND FLEXIBLE DISPLAY DEVICE

(75) Inventors: Seung Han Paek, Incheon (KR); Kyoung Mook Lee, Ansan-si (KR); Sung Hwan Kim, Incheon (KR); Su Ho Kim, Gumi-si (KR)

(73) Assignee: LG Display Co., Ltd., Seoul (KR)

( * ) Notice: Subject to any disclaimer, the term of this patent is extended or adjusted under 35 U.S.C. 154(b) by 1100 days.

(21) Appl. No.: 11/980,650

(22) Filed: Oct. 31, 2007

(65) Prior Publication Data

US 2008/0277375 A1 Nov. 13, 2008

(30) Foreign Application Priority Data

May 9, 2007 (KR) .................. 10-2007-0044823

(51) Int. Cl.
*H01B 13/00* (2006.01)
*B44C 1/22* (2006.01)

(52) U.S. Cl. ............... 216/13; 216/17; 216/23; 216/24; 216/83

(58) Field of Classification Search ............... 216/13, 216/17, 23, 83
See application file for complete search history.

(56) References Cited

U.S. PATENT DOCUMENTS

| | | | | |
|---|---|---|---|---|
| 7,736,997 B2* | 6/2010 | Takechi | ............ | 438/459 |
| 2006/0017865 A1* | 1/2006 | Tsubata et al. | ............ | 349/106 |
| 2006/0137504 A1* | 6/2006 | Nishio et al. | ............ | 83/875 |
| 2007/0138949 A1* | 6/2007 | Yoshida et al. | ............ | 313/504 |
| 2007/0297039 A1* | 12/2007 | Lee et al. | ............ | 359/296 |
| 2008/0110862 A1* | 5/2008 | Kim et al. | ............ | 216/83 |
| 2009/0140258 A1* | 6/2009 | Yoshinaga et al. | ............ | 257/66 |

FOREIGN PATENT DOCUMENTS

| | | |
|---|---|---|
| CN | 1517749 A | 8/2004 |
| CN | 1921715 A | 2/2007 |

OTHER PUBLICATIONS

A. Henzen et al., "Development of Active Matrix Electronic Ink Displays for Handheld Devices", SID 03 Digest, pp. 176-179.
R. Zehner et al., "Drive Waveforms for Active Matrix Electrophoretic Displays", SID 03 Digest, pp. 842-845.
M. Pitt, "Power Consumption of Micro-encapsulated Electrophoretic Displays for Smart Handheld Applications", SID 02 Digest, pp. 1387-1381.
D. Duthaler et al., "Active-Matrix Color Displays Using Electrophoretic Ink and Color Filters", SID 02 Digest, pp. 1374-1377.

(Continued)

*Primary Examiner* — Shamim Ahmed
(74) *Attorney, Agent, or Firm* — McKenna, Long and Aldridge, LLP.

(57) ABSTRACT

A method for manufacturing a flexible electrophoretic display device, including: providing a metal mother substrate having a first thickness, including a unit display panel region and a non-display region adjacent the unit display panel region; forming a display element in the unit display panel region; forming a groove in the non-display region of the mother substrate; cutting the mother substrate along the groove to separate the unit display panel region from the mother substrate; thinning the substrate of the separated unit display panel region; and forming an electrophoretic ink film on the unit display panel region.

17 Claims, 10 Drawing Sheets

OTHER PUBLICATIONS

R. Webber, "Image Stability in Active-Matrix Microencapsulated Electrophoretic Displays", SID 02 Digest, pp. 126-129.

K. Amundson er al., "Flexible, Active-Matrix Display Constructed Using a Microencapsulated Electrophoretic Material and an Organic-Semiconductor-Based Backplane", SID 01 Digest, pp. 160-163.

Y. Chen et al., "A Conformable Electronic Ink Display Using a foil-Based a-Si TFT Array", SID 01 Digest, pp. 157-159.

P. Kazlas et al., "SVGA Microencapsulation Electropherotic Active Matrix Display for Information Appliances", SID 01 Digest, pp. 152-155.

* cited by examiner

METHOD FOR MANUFACTURING FLEXIBLE DISPLAY SUBSTRATE AND FLEXIBLE DISPLAY DEVICE This application claims the benefit of Korean Patent Application No. 10-2007-0044823, filed on May 9, 2007, which is hereby incorporated by reference for all purposes as if fully set forth herein.

BACKGROUND OF THE INVENTION

1. Field of the Invention

The present invention relates to a method for manufacturing a flexible display substrate and flexible display device.

2. Discussion of the Related Art

As the information society becomes more advanced, a variety of flat display devices have been developed. Examples of flat display devices include liquid crystal display (LCD) devices, plasma display panel (PDP) devices, electro-luminescent display devices (ELD), and vacuum fluorescent display devices (VFD).

The recent trend is that flat panel display devices are applied to portable products, e.g., electronic sheets, arm bands, wallets, notebook computers, etc. To this end, development of flexible display devices is in progress.

Display devices mounted on portable products, e.g., electronic sheets, arm bands, wallets, notebook computers, E-books, etc., must be flexible against external forces. Accordingly, flexible substrates are used in these display devices.

A typical flexible substrate has a thickness of 1 mm or less. Because such a flexible substrate is infrangible, light and pliable, it may be deformed in various shapes.

Accordingly, many studies have been conducted to apply the flexible substrates to a variety of display devices, e.g., LCD devices, organic electro-luminescent display devices, etc.

FIG. 1 is a flowchart illustrating a method for manufacturing a related art flexible display substrate, and FIGS. 2A and 2B are perspective views of a related art flexible display substrate manufactured by the method of FIG. 1.

Referring to FIG. 2A, a mother substrate 100 is prepared (S110). At least one unit display panel (P) region is defined on the mother substrate 100.

Referring to FIG. 2B, a display element 10 is formed in the unit display panel region (S120).

Referring to FIGS. 2C and 2D, the mother substrate 100 is cut along a scribing lane 111 around the unit display panel region (S130). Thus, the unit display panel P is separated from the mother substrate 100.

However, burrs may occur at edges of the unit display panel P in the process of cutting the mother substrate 100 using a press, degrading the quality of the display substrate.

Further, when the mother substrate 100 is thick, a cutter of the press becomes extremely worn out and thus the lifetime of the press is reduced.

Furthermore, the display substrate may be contaminated by particles generated in the process of cutting the mother substrate 100 using the press.

SUMMARY OF THE INVENTION

Accordingly, the present invention is directed to a method for manufacturing a flexible display substrate that substantially obviates one or more of the problems due to limitations and disadvantages of the related art.

An advantage of the present invention is to improve the reliability of a display panel and easily separate a unit display panel from a mother substrate.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, a method for manufacturing a flexible electrophoretic display device, includes: providing a metal mother substrate having a first thickness, including a unit display panel region and a non-display region adjacent the unit display panel region; forming a display element in the unit display panel region; forming a groove in the non-display region of the mother substrate; cutting the mother substrate along the groove to separate the unit display panel region from the mother substrate; thinning the substrate of the separated unit display panel region; and forming an electrophoretic ink film on the unit display panel region.

In another aspect of the present invention, A method for manufacturing a flexible electrophoretic display device, includes: providing a metal mother substrate having a first thickness such that the mother substrate is substantially inflexible, including a unit display panel region and a non-display region adjacent the unit display panel region; forming a display element in the unit display panel region; forming a groove in the non-display region of the mother substrate; cutting the mother substrate along the groove to separate the unit display panel region from the mother substrate; thinning the substrate of the separated unit display panel region such that the thinned substrate has a flexible characteristic; and forming an electrophoretic ink film on the unit display panel region.

In yet another aspect of the present invention, a method for manufacturing a flexible electrophoretic display device, including: providing a metal mother substrate having a first thickness, includes a unit display panel region and a non-display region adjacent the unit display panel region; forming a display element in the unit display panel region; patterning the mother substrate to form a groove in the non-display region; cutting the mother substrate along the groove to separate the unit display panel region from the mother substrate; thinning the substrate of the separated unit display panel region; and forming an electrophoretic ink film on the unit display panel region.

In yet another aspect of the present invention, a method for manufacturing a flexible display substrate, includes: providing a metal mother substrate having a first thickness, including a unit display panel region and a non-display region adjacent the unit display panel region; forming a display element in the unit display panel region; forming a groove in the non-display region of the mother substrate; cutting the mother substrate along the groove to separate the unit display panel region from the mother substrate; thinning the substrate of the separated unit display panel region.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE ILLUSTRATED EMBODIMENTS

Reference will now be made in detail to embodiments of the present disclosure, examples of which are illustrated in the accompanying drawings.

Figure 1:
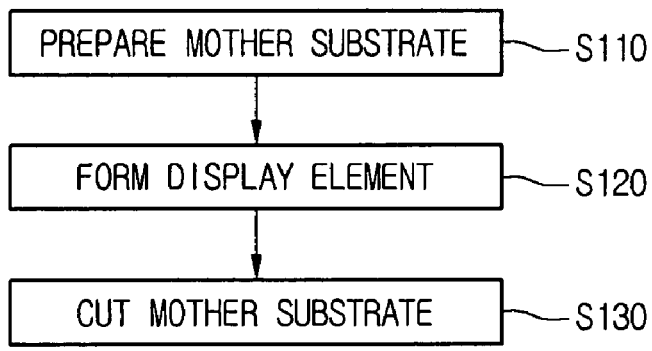
FIG. 1 is a flowchart illustrating a method for manufacturing a related art flexible display substrate.
Figure 2A:
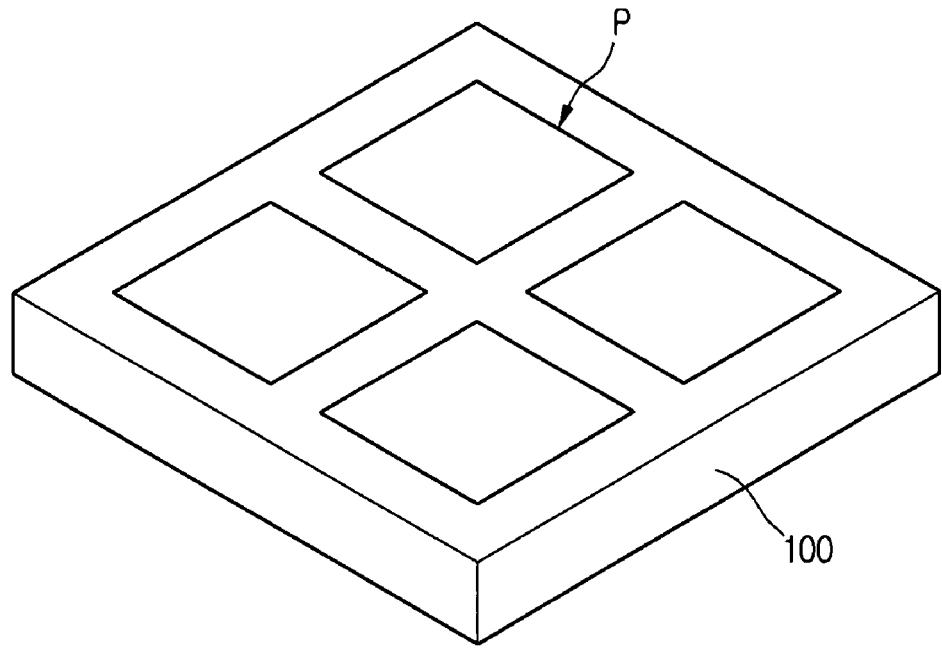
FIGS. 2A to 2D are perspective views of a flexible display substrate manufactured by the method of FIG. 1.
Figure 2B:
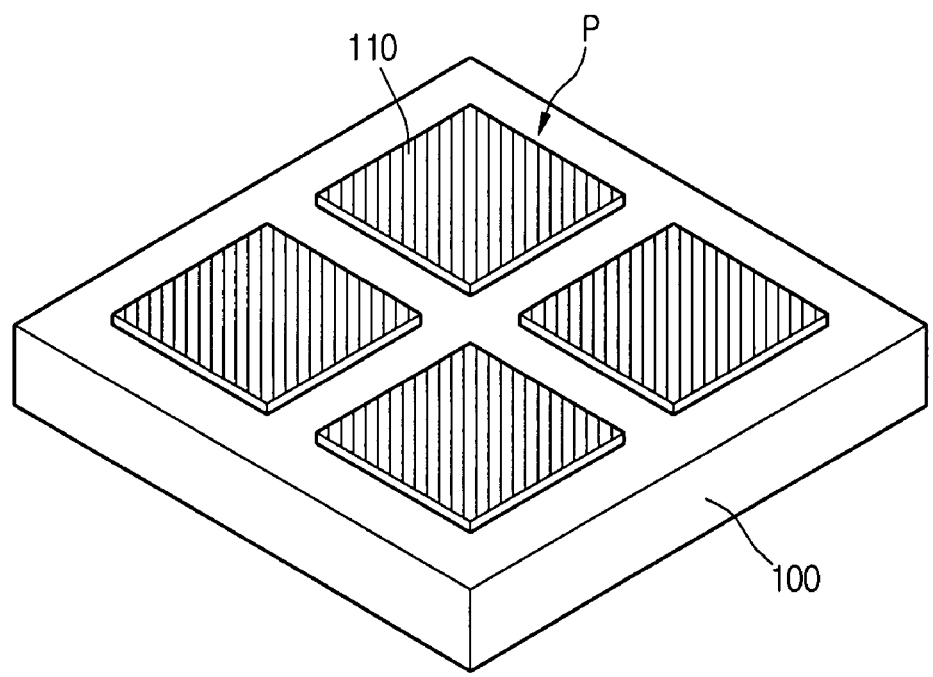
Figure 2C:
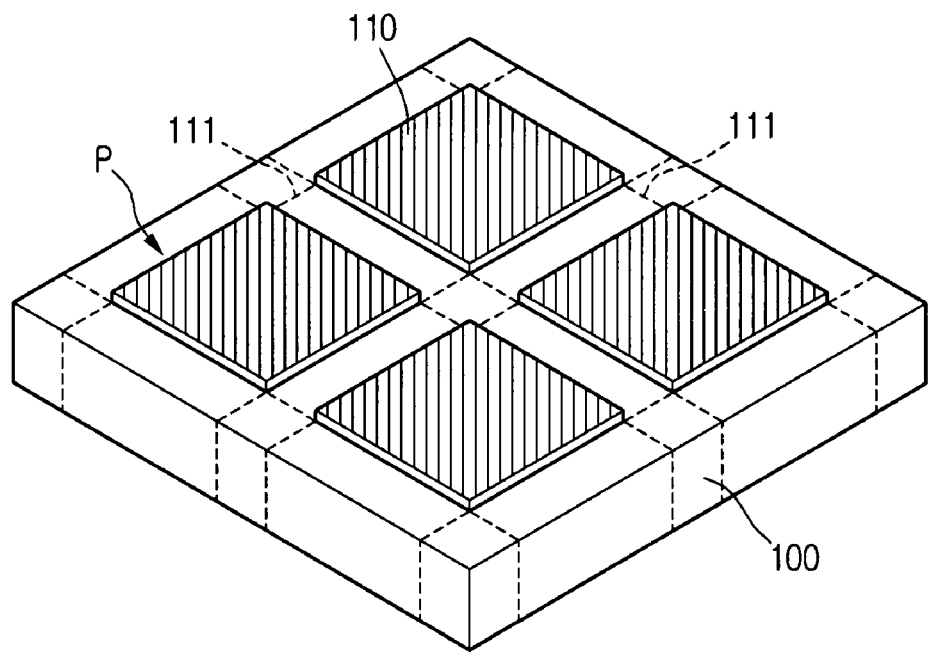
Figure 2D:
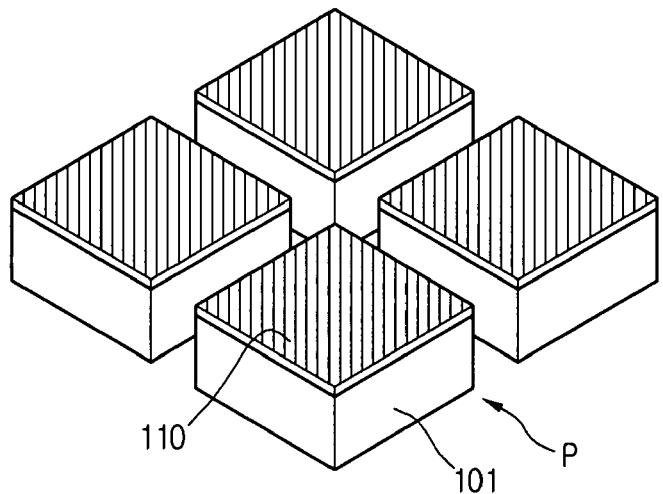
Figure 3:
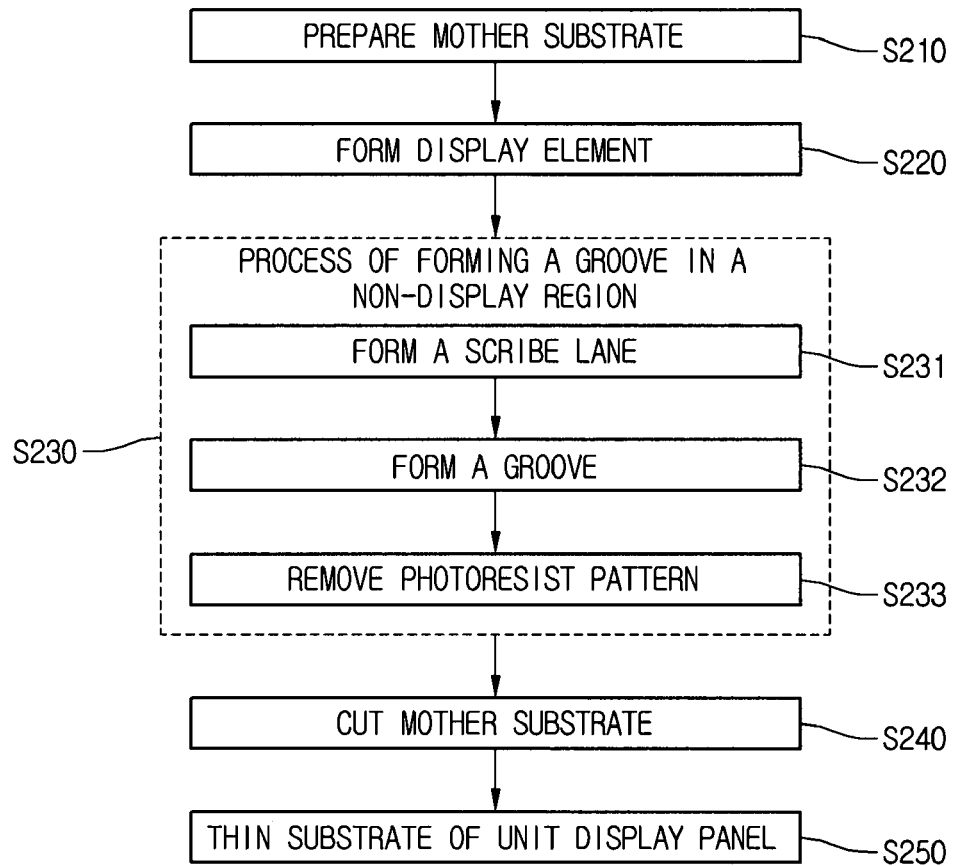
FIG. 3 is a flowchart illustrating a method for manufacturing a flexible display substrate according to an embodiment.

FIG. 3 is a flowchart illustrating a method for manufacturing a flexible display substrate according to an embodiment.

The method includes a process S210 of preparing a mother substrate, a process S220 of forming a display element, a process S230 of forming a groove in a non-display region, a process S240 of cutting the mother substrate, and a process S250 of thinning the substrate of a unit display panel.

Figure 4A:
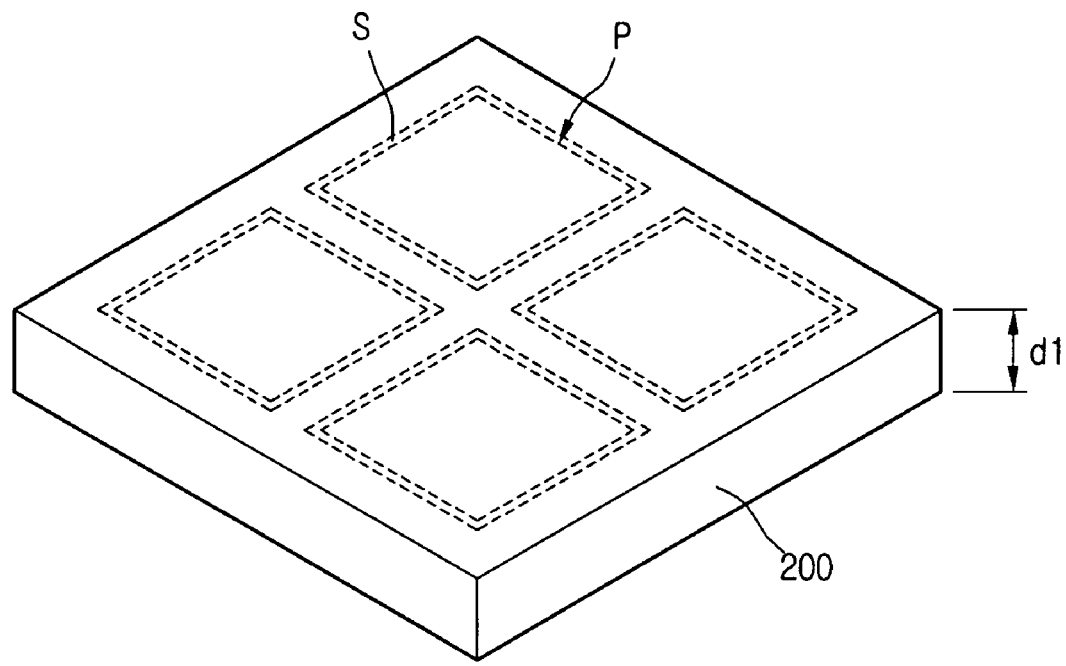
FIG. 4A is a perspective view illustrating a process of preparing a mother substrate.
Figure 4B:
FIG. 4B is a cross-sectional view illustrating the process of preparing the mother substrate illustrated in FIG. 4A.

FIG. 4A is a perspective view illustrating a process of preparing a mother substrate, and FIG. 4B is a cross-sectional view illustrating the process of preparing the mother substrate illustrated in FIG. 4A.

Referring to FIGS. 3, 4A and 4B, a mother substrate 200 having a first thickness d1 is prepared (S210). The mother substrate 200 may be a metal substrate. For example, the metal substrate may be formed of stainless steel or iron (Fe). Alternatively, the mother substrate 200 may be a plastic substrate.

A manufacturing process may be stably performed because the mother substrate 200 is substantially inflexible because of its first thickness d1. The first thickness d1 of the mother substrate 200 may be more than about 0.3 mm. The first thickness d1 may prevent the mother substrate 200 from being bent.

The mother substrate 200 has a unit display panel (P) region and a non-display region adjacent the unit display panel (P) region. The mother substrate 200 includes at least one unit display panel P.

Figure 5A:
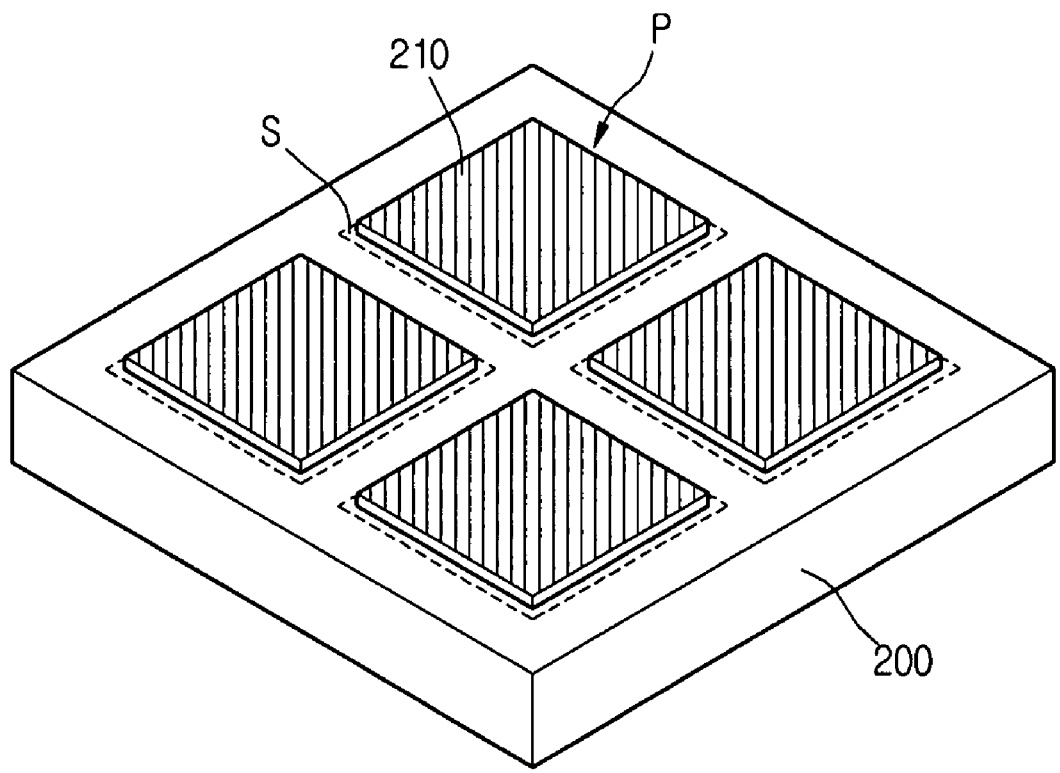
FIG. 5A is a perspective view of the mother substrate where a display element is formed.
Figure 5B:
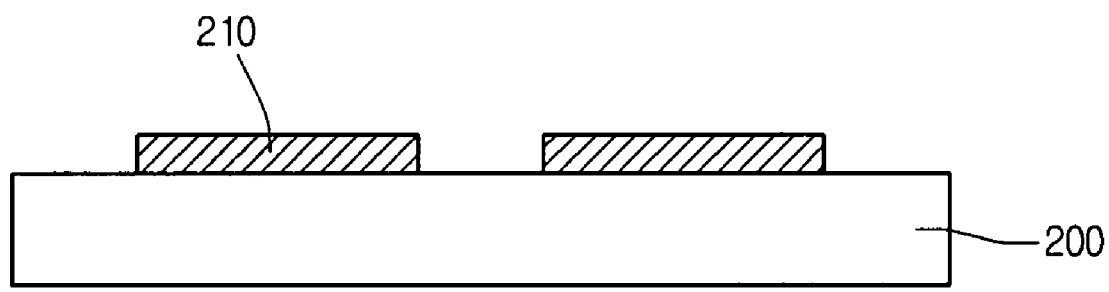
FIG. 5B is a cross-sectional view of the mother substrate illustrated in FIG. 5A.

FIG. 5A is a perspective view of the mother substrate where a display element 210 is formed, and FIG. 5B is a cross-sectional view of the mother substrate illustrated in FIG. 5A.

Referring to FIGS. 3, 5A and 5B, a display element 210 is formed in the unit display panel (P) region of the mother substrate 200 (S220). In the process S220, various patterns for the flexible display substrate are formed on the mother substrate 200.

For example, the display element may be a bottom array substrate including thin film transistors where the flexible display substrate is for an electrophoretic display device (EPD). Further, the display element may be a top array substrate including electrophoretic floating particles.

On the other hand, in the case where the flexible display substrate is for an LCD device, the display element may be an array substrate including thin film transistors. Further, the display element may be an array substrate including color filter patterns. A process of forming the array substrate including the thin film transistors will be briefly described below.

A gate line is formed on a substrate. The gate line includes a gate electrode. A gate insulating layer is formed over the substrate where the gate line is formed.

The gate insulating layer may be formed of silicon nitride ($SiN_x$) or silicon oxide ($SiO_x$). A semiconductor layer is formed on the gate insulating layer above the gate electrode.

The semiconductor layer includes a first semiconductor layer and second semiconductor layers. The second semiconductor layers are spaced apart from each other and formed on one side and another side of the first semiconductor layer.

The first semiconductor layer is formed of amorphous silicon (a-Si), and the second semiconductor layers are formed of heavily-doped n-type amorphous silicon (n+a-Si).

A data line crossing the gate line is formed on the substrate to define a pixel region. The data line includes a source electrode and a drain electrode formed on the second semiconductor layer.

The source electrode is connected to one of the second semiconductor layers, and the drain electrode is connected to the other. The data line, the source electrode, and the drain electrode are formed of the same material and are simultaneously formed through one-time process.

The source electrode and the drain electrode are spaced apart from each other by a predetermined distance and thus the first semiconductor layer is exposed between the source electrode and the drain electrode, thereby forming a channel.

The gate electrode, the gate insulating layer, the semiconductor layer, the source electrode, and the drain electrode are formed of thin film transistors (TFTs), and at least one or more are disposed in the pixel region.

A passivation layer is formed on the substrate where the TFTs are formed. The passivation layer includes a drain contact hole exposing a portion of the drain electrode. A pixel electrode is formed in the pixel region above the passivation layer. The pixel electrode is connected to the drain electrode through the drain contact hole.

The pixel electrode is formed of a transparent conductive material, e.g., indium tin oxide (ITO), indium zinc oxide (IZO), etc.

A process of forming an array substrate including color filter patterns will be described below.

A light blocking layer is formed at a region corresponding to the boundary of the pixel region and the TFT region. Examples of the light blocking layer may include a black matrix that absorbs or blocks light.

If the display device is one requiring a color filter, red, green and blue color filter patterns are formed at a region corresponding to the pixel region on the substrate where the light blocking layer is formed.

In this way, the display element 210 is formed in the unit display panel (P) region of the mother substrate 200.

After the process S220 of forming the display element, a groove in a non-display region is formed S230. In an embodiment, a scribe lane (S) is formed in the non-display region, and a groove is formed in the scribe lane (S). The scribe lane may be formed by forming a photoresist pattern S231. The groove may be formed by etching the mother substrate S232, and the photoresist pattern may be removed S233.

The forming of the scribe lane may be performed using a photolithography process.

Figure 6A:
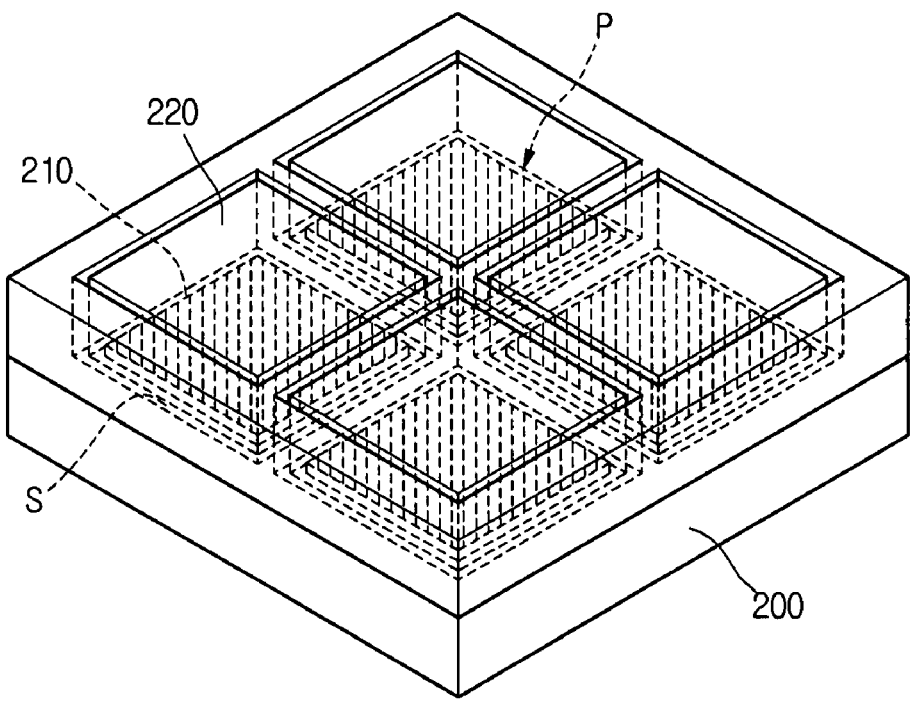
FIG. 6A is a perspective view illustrating a process of forming a scribe lane.
Figure 6B:
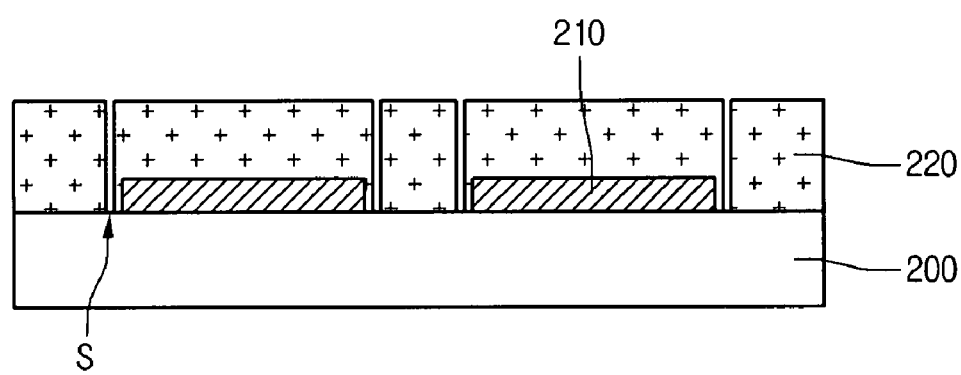
FIG. 6B is a cross-sectional view illustrating the process of forming the scribe lane in FIG. 6A.

FIG. 6A is a perspective view illustrating a process of forming the scribe lane, and FIG. 6B is a cross-sectional view illustrating the process of forming the scribe lane in FIG. 6A.

Referring to FIGS. 3, 6A and 6B, a photoresist pattern 220 is formed on the mother substrate 200 wherein the display element 210 is formed (S231).

An protective layer may be formed in a non-display region on the mother substrate 200.

The photoresist pattern 220 is formed on or above the mother substrate 200. The photoresist pattern 220 may be formed on the protective layer above the mother substrate 200.

The photoresist pattern 220 covers the unit display panel P.

The photoresist pattern 220 exposes the scribe lane (S) around the unit display panel P.

Figure 7A:
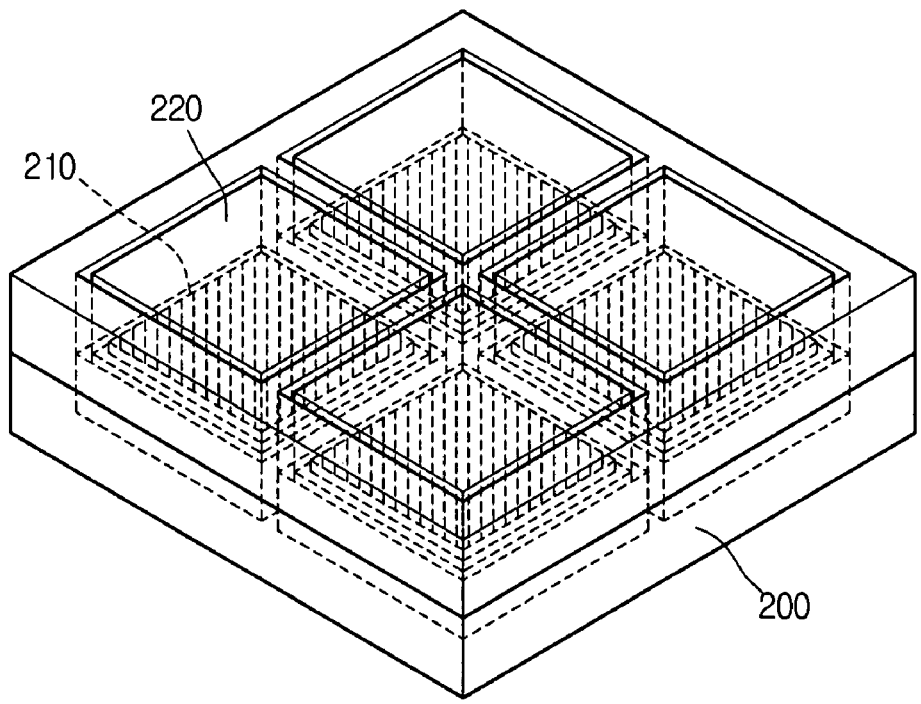
FIG. 7A is a perspective view illustrating a process of forming a groove.
Figure 7B:
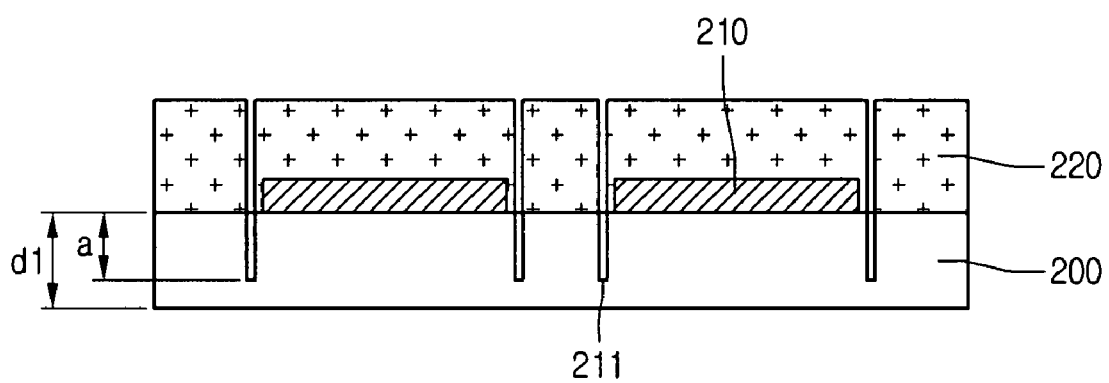
FIG. 7B is a cross-sectional view illustrating the process of forming the groove in FIG. 7A.

FIG. 7A is a perspective view illustrating a process of forming a groove in a scribe lane, and FIG. 7B is a cross-sectional view illustrating the process of forming the groove in FIG. 7A.

Referring to FIGS. 3, 7A and 7B, the exposed scribe lane (S) of the mother substrate 200 is etched using the photoresist pattern 220 as an etch mask, thereby forming a groove 211 (S232).

The exposed scribe lane (S) may be etched by a wet etching process. An etchant used in the wet etching process may contain halogen elements, such as chlorine (Cl), bromine (Br), and iodine (I). The etchant may contain iron chloride. The protective layer on the exposed mother substrate 200 may be further etched using the photoresist pattern 220 as an etch mask.

The groove 211 makes it easy to cut the mother substrate 200 so as to separate the unit display panel P from the mother substrate 200.

The depth "a" of the groove 211 is smaller than the first thickness "d1" of the mother substrate 200.

Figure 8A:
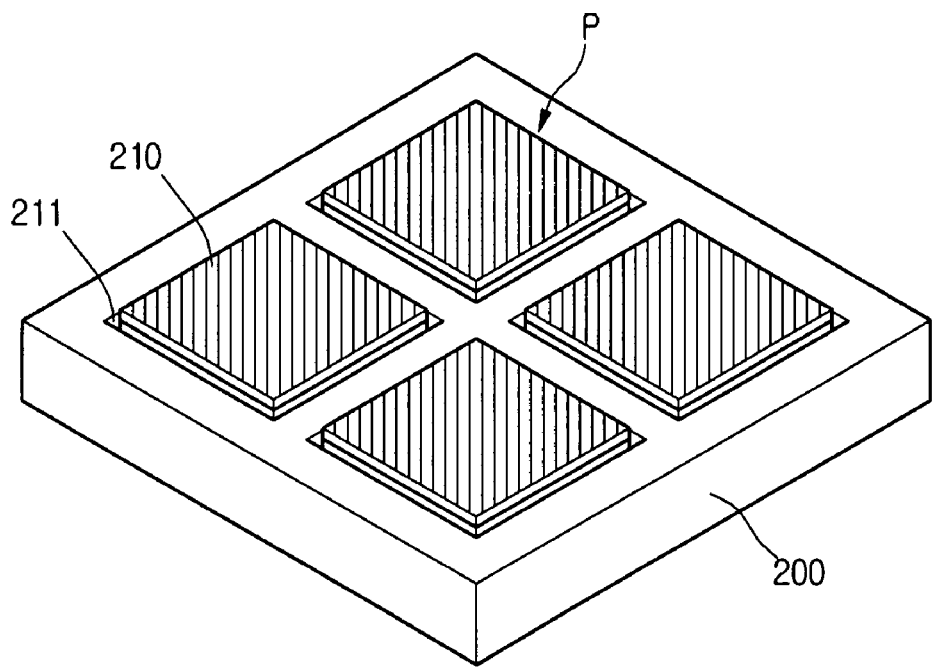
FIG. 8A is a perspective view illustrating a process of forming a groove.
Figure 8B:
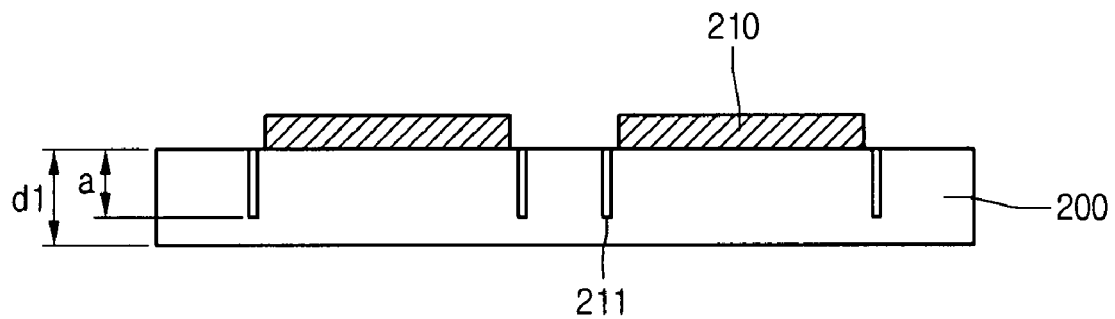
FIG. 8B is a cross-sectional view illustrating the process of forming the groove in FIG. 8A.

FIG. 8A is a perspective view illustrating a process of forming a groove in a scribe lane, and FIG. 8B is a cross-sectional view illustrating the process of forming the groove in FIG. 8A.

Referring to FIGS. 3, 8A and 8B, the photoresist pattern 220 on the mother substrate 200 is removed (S233).

Figure 9A:
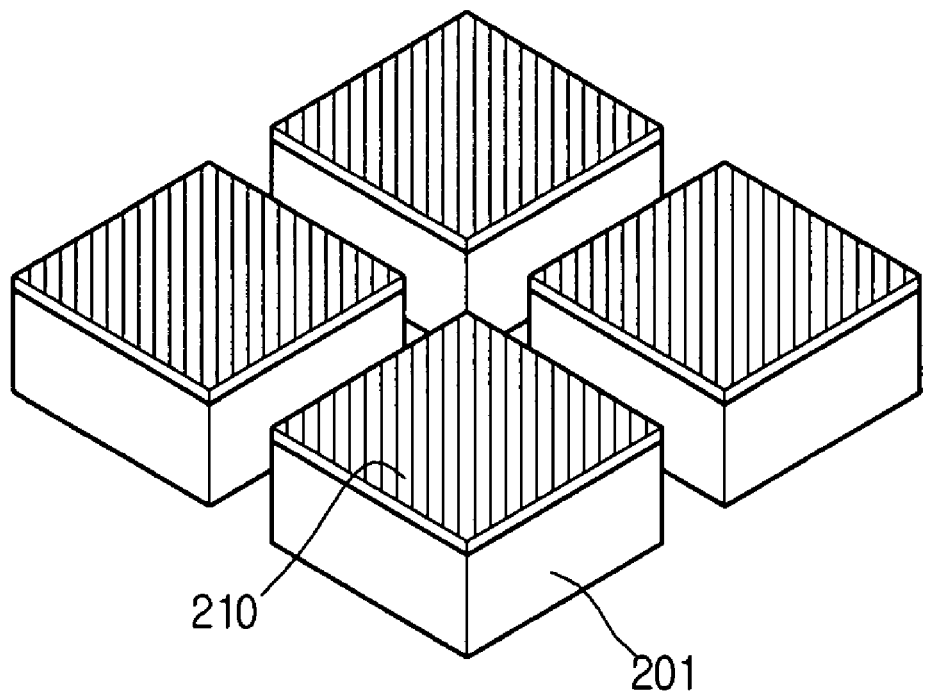
FIG. 9A is a perspective view illustrating a process of cutting the mother substrate.
Figure 9B:
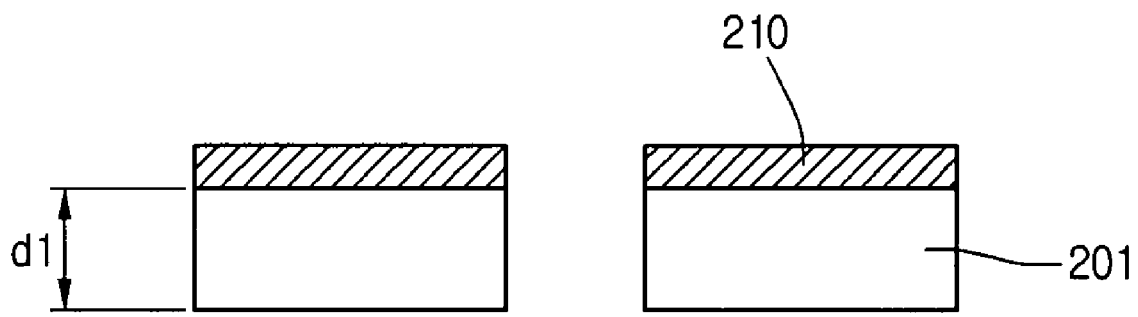
FIG. 9B is a cross-sectional view illustrating the process of cutting the mother substrate in FIG. 9A.

FIG. 9A is a perspective view illustrating a process of cutting the mother substrate, and FIG. 9B is a cross-sectional view illustrating the process of cutting the mother substrate in FIG. 9A.

Referring to FIGS. 3, 9A and 9B, the mother substrate 200 is cut along the groove 211 in the non-display region (S240). The unit display panel P is separated from the mother substrate 200.

The groove 211 has a small thickness of "d1-a" so that the mother substrate 200 may be easily cut.

The cutting process may be performed using one of scribing wheel, press, plasma, gas, laser, and hydraulic pressure.

More specifically, the scribing wheel is formed of a material having a strength higher than the mother substrate 200. For example, the scribing wheel may contain diamond.

The press has a cutter corresponding to the scribe lane. The mother substrate 200 may be cut by pressing it with the cutter of the press. A crank of the press changes a rotational motion into a straight motion, so that the mother substrate 200 is cut by the cutter.

In this way, the unit display panel P is separated from the mother substrate 200. The unit display panel P includes the display element 210 on one surface of the substrate 201. The substrate 201 has the first thickness d1.

The unit display panel may be separated from the mother substrate by cutting the mother substrate using laser beam. The laser beam is irradiated onto the other surface of the mother substrate 200, where the display element and the groove are not formed.

The mother substrate 200 may be cut by irradiating the laser beam along the groove 211. When the laser beam is irradiated onto the other surface of the mother substrate 200, the display element may be damaged by the laser beam.

The laser beam may be irradiated onto one surface of the mother substrate, where the display element is formed. In this case, the laser beam cuts the mother substrate 200 along the groove 211. Meanwhile, a passivation film may be further formed to cover the display element.

A plurality of laser headers may be provided. The laser headers generate the laser beam to the respective unit display panels, thereby improving the yield of the display device.

After cutting the mother substrate, edges of the substrate of the separated unit display panel region may be subject to grinding.

Figure 10:
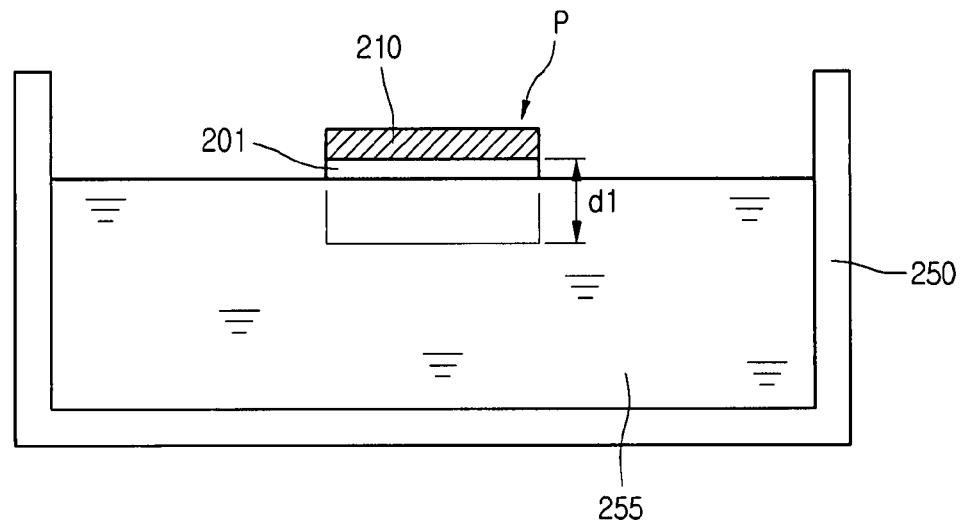
FIG. 10 is a cross-sectional view illustrating a process of thinning the substrate of the unit display panel.
Figure 11:
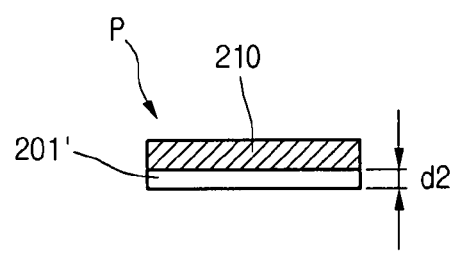
FIG. 11 is a cross-sectional view of the unit display panel in FIG. 10.

FIG. 10 is a cross-sectional view illustrating a process of thinning the substrate of the unit display panel by etching, and FIG. 11 is a cross-sectional view of the unit display panel in FIG. 10.

Referring to FIGS. 3, 10 and 11, the substrate 201 is made thin by etching the other surface of the substrate 201, where the display element 210 is not formed, so as to provide the flexible characteristic to the unit display panel P (S250).

The thinned substrate 201' has a second thickness d2 less than the first thickness d1. The second thickness d2 is less than about 70% of the first thickness d1.

The process of thinning the substrate 201 by etching may be performed by dipping the other surface of the substrate 201 into an etchant 255 contained in a tank 250. The etchant 255 contains halogen elements, such as chlorine (Cl), bromine (Br), and iodine (I). The etchant may contain iron chloride. The other surface of the substrate 201, which contacts the etchant 255, is etched so that the thinned substrate 201' has the second thickness d2. Therefore, the thinned substrate 201' has a flexible characteristic.

A protective film may be further formed on the display element 210 of the unit display panel P to prevent the display element from being damaged by the etchant. The protective film may be removed after the etching.

Then, the unit display panel P is cleaned to remove the remaining etchant 255.

In addition to the dipping process, the substrate 201 may be etched by spraying the etchant through a nozzle. Thinning the substrate may also include other types of etching. In addition to the etching process, the substrate 201 may be thinned by grinding.

Figure 12:
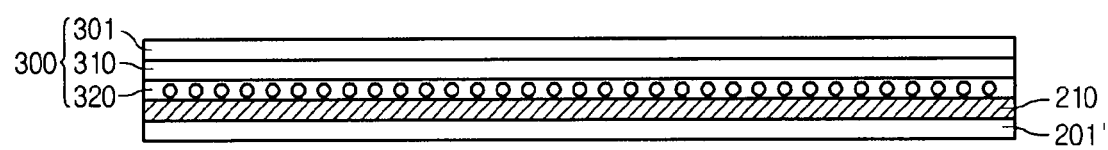
FIG. 12 is a cross-sectional view of a flexible electrophoretic display device according to an embodiment.

FIG. 12 is a cross-sectional view of a flexible electrophoretic display device according to an embodiment.

Referring to FIG. 12, an electrophoretic display device may include a thinned substrate 201', a display element 210 and an electrophoretic ink film 300 (such as E-INK film by E-INK corporation). The electrophoretic ink film 300 may include a microcapsule layer 320, a common electrode 310 and a protective film 301. In one embodiment, the electrophoretic ink film may be formed by laminating.

According to embodiments, the bending of the substrate at a high process temperature may be prevented because the display element is formed on the mother substrate 200 that is sufficiently thick. Therefore, the stability of the manufacturing process of the flexible display substrate may be secured and the reliability of the flexible display device may be improved.

Further, after forming the display element on the mother substrate that is sufficiently thick, the flexible substrate is supported by etching one surface of the mother substrate, where the display element is not formed. Therefore, it is unnecessary to develop a separate member or equipment, thereby saving development expenses and simplifying the manufacturing process.

Moreover, the groove may be formed around the unit display panel and the mother substrate is cut along the groove. Therefore, the unit display panel may be easily separated from the mother substrate.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A method for manufacturing a flexible electrophoretic display device, comprising:
   providing a metal mother substrate having a first thickness, including a unit display panel region and a non-display region adjacent the unit display panel region;
   forming a display element in the unit display panel region;
   forming a photoresist pattern exposing a portion of the non-display region;
   etching the mother substrate to form a groove according to the portion of the non-display region exposed by the photoresist pattern;
   cutting the mother substrate along the groove to separate the unit display panel region from the mother substrate;
   thinning the substrate of the separated unit display panel region; and
   forming an electrophoretic ink film on the unit display panel region.

2. The method according to claim 1, wherein the first thickness is greater than about 0.3 mm.

3. The method according to claim 2, wherein thinning the substrate includes thinning to less than about 70% of the first thickness.

4. The method according to claim 1, wherein thinning the substrate includes etching the substrate.

5. The method of claim 4, wherein etching the substrate includes wet etching with an etchant including an halogen element.

6. The method according to claim 4, wherein etching the substrate includes dipping the substrate or spraying the substrate.

7. The method according to claim 1, further comprising grinding edges of the substrate of the separated unit display panel region.

8. The method according to claim 1, wherein foiming the electrophoretic ink film includes:
   forming a common electrode;
   forming a microcapsule layer; and
   forming a protection layer.

9. A method for manufacturing a flexible electrophoretic display device, comprising:
   providing a metal mother substrate having a first thickness such that the mother substrate is substantially inflexible, including a unit display panel region and a non-display region adjacent the unit display panel region;
   forming a display element in the unit display panel region;
   forming a photoresist pattern exposing a portion of the non-display region;
   etching the mother substrate to form a groove according to the portion of the non-display region exposed by the photoresist pattern;
   cutting the mother substrate along the groove to separate the unit display panel region from the mother substrate;
   thinning the substrate of the separated unit display panel region such that the thinned substrate has a flexible characteristic; and
   forming an electrophoretic ink film on the unit display panel region.

10. The method according to claim 9, wherein forming the electrophoretic ink film includes:
    forming a common electrode;
    forming a microcapsule layer; and
    forming a protection layer.

11. A method for manufacturing a flexible electrophoretic display device, comprising:
    providing a metal mother substrate having a first thickness, including a unit display panel region and a non-display region adjacent the unit display panel region;
    forming a display element in the unit display panel region;
    forming a photoresist pattern exposing a portion of the non-display region;
    etching the mother substrate to form a groove according to the portion of the non-display region exposed by the photoresist pattern;
    cutting the mother substrate along the groove to separate the unit display panel region from the mother substrate;
    thinning the substrate of the separated unit display panel region; and
    forming an electrophoretic ink film on the unit display panel region.

12. The method according to claim 11, wherein forming the electrophoretic ink film includes:
    forming a common electrode;

forming a microcapsule layer; and forming a protection layer.

13. A method for manufacturing a flexible display substrate, comprising:
- providing a metal mother substrate having a first thickness, including a unit display panel region and a non-display region adjacent the unit display panel region;
- forming a display element in the unit display panel region;
- forming a groove in the non-display region of the mother substrate;
- cutting the mother substrate along the groove to separate the unit display panel region from the mother substrate; and
- thinning the substrate of the separated unit display panel region.

14. The method of claim 13, wherein a depth of the groove is most of a thickness of the mother substrate.

15. The method of claim 13, wherein the display element and the groove are formed on a first side of the mother substrate.

16. The method of claim 13, wherein cutting the mother substrate includes irradiating a laser beam along the groove in the non-display region of the mother substrate.

17. The method of claim 13, wherein a plurality of grooves are formed in a non-display region of the mother substrate between adjacent unit display panel regions.

* * * * *